United States Patent [19]

McAulay

[11] Patent Number: 4,686,532
[45] Date of Patent: Aug. 11, 1987

[54] ACCURATE LOCATION SONAR AND RADAR

[75] Inventor: Alastair D. McAulay, Dallas, Tex.

[73] Assignee: Texas Instruments Incorporated, Dallas, Tex.

[21] Appl. No.: 739,932

[22] Filed: May 31, 1985

[51] Int. Cl.⁴ ............................................. G01S 7/44
[52] U.S. Cl. ..................................... 342/195; 367/87
[58] Field of Search ..................... 343/5 CM, 5 DA; 367/87–88; 342/27, 118, 147, 195–197; 364/423, 460, 724, 726, 736

[56] References Cited

U.S. PATENT DOCUMENTS 3,885,224  5/1975  Klahr ........................... 343/5 DP X
3,978,480  8/1976  Tsuruta et al. ................. 343/5 DP
4,321,601  3/1982  Richman ........................ 343/5 CM Primary Examiner—T. H. Tubbesing
Assistant Examiner—Bernarr Earl Gregory
Attorney, Agent, or Firm—Kenneth C. Hill; James T. Comfort; Melvin Sharp

[57] ABSTRACT

A sonar or radar permits primary distributed scatterers that are close to the sonar or radar relative to the array dimension to be rapidly and accurately located and pertinent characteristics to be estimated, such as Doppler and complex scattering strength. The region viewed is partitioned in annuli instead of in angular pie shaped slices as is normally the case for conventional sonar. This avoids the difficulty with conventional sonar or radar of distinguishing whether a scatterer is in a side lobe or the main beam an dis preferable to conventional sonars or radars in the important case of approaching multiple scatterers, e.g. robotic vehicle sensors or torpedo terminal homing on a target, because near regions may be examined in all directions prior to further regions. Computational speed is achieved by utilizing precomputation and leaving only part of the computation to be performed in real time.

11 Claims, 4 Drawing Figures

ACCURATE LOCATION SONAR AND RADAR

BACKGROUND OF THE INVENTION

The present invention relates sonar and radar, and, more particularly, to methods of rapid and accurate mapping of the characteristics of nearby scatterers for array sonar and radar.

It is a problem in known array sonar systems to rapidly obtain an accurate map of the location, strength and movement of primary scatterers in the media immediately surrounding a sonar array. This is important where there are multiple sources of interest, e.g. determining ocean surface and volume backscatter characteristics, estimation of fish population, robotic vehicle sensors, target identification, and torpedo terminal homing. In the latter cases, the multiple sources are from a single target and may be used to establish vital charateristics of the target: class, position, orientation and motion. Critical requirements in many of these situations are the ability to perform rapid computations and the ability to survey near regions in all directions prior to ones further away.

Several features of conventional sonars limit the accuracy or ability of these systems to solve this problem. These features include the general practice for the simplest to the most sophisticated sonar receivers of partitioning the receiver into a spatial and a temporal part. This practice is based on Middleton D. and Groginsky. H. L., "Detection of Random Acoustic Signals by Receivers with Distributed Elements: Optimum Receiver Structures for Normal Signal and Noise Fields", Journal Acoustic Society of America 38, 727 (1965) and Straddling C. S. and Baggeroer A. B. "Joint Active and Passive Sonar Signal Processing using Arrays", Naval Research and Development Center TP 121, December 1968. The first part of the sonar receiver processor depends only on array properties and involves spatial processing or beamforming. Samples of the received signal are multiplied by a weight and delayed before combining in order to provide different sensitivities to different angular directions. Usually this sensitivity is maximized for a given direction. The second part of the processor depends on statistical properties of the signal and external and internal noise, e.g. matched filtering. These approaches encounter difficulties when applied to the specific problem of close, fast moving multiple scatterers.

Several problems arise directly from this use of receiver beamforming. (1) A major source of performance degradation with beams is caused by the existence of side lobes or directions having sensitivity peaks other than the desired main lobe peak. A source in a side lobe direction, a direction substantially different from that of the main lobe, cannot be distinguished in direction from a weaker source in the main lobe direction. Reduction of side lobe sensitivity magnitude may be accomplished at the expense of an undesirable degradation in angular resolution of the main lobe. Widely spread scatterers may not be accurately located due to sidelobes. Adaptive beamforming, including recent developments in high resolution eigen beamforming (see Schmidt R., "Multiple Emitter Location and Signal Parameter Estimation", Proc. RADC Spectral Estimation Workshop, Rome N.Y. 1979, p243–258 and Wax M and Kailath T, "Extending the Thresholds of the Eigenstructure Methods", Proc. International Conference on Acoustics, Speech and Signal Processing, (1985) enable the determination of accurate direction for discrete far scatterers and would not be expected to perform well with close, fast moving sources or scatterers. (See items (3) and (4) below.)

(2) The desire for wide or omnidirectional coverage, with narrow beams for directional information, means that the beam must be rotated by mechanical or electronic means through a wide angle. The rotation must be sufficiently slow so that energy from the furthest distance to be scanned has time to return to the array before the beam is moved to the next angular direction. An approaching object has time to approach from a given direction while the beam is scanning other directions. The cost of simultaneously forming a large number of beams for substantial angular coverage is normally too great for practical consideration. Close, fast moving multiple scatterers, as might arise in torpedo terminal homing, do not permit time for scanning. Simultaneous forming of multiple beams would generally require more equipment than would be economic or physically reasonable.

(3) Conventional beamforming assumes that the sources are at a sufficient distance that the waves striking the array have plane wave fronts. This determines the phase delays to be incorporated at each receiving element so that signals from the elements will add for waves coming from a specific direction. Near sources will not generate plane wave fronts at the array. Near may be many kilometers for surveillance arrays spreading over tens of kilometers.

(4) Partitioning a sonar receiver into spatial and temporal parts is optimal only for stationary processes. Scatterers with speeds having high transverse components at short range will not meet this criteria and will present difficulties for a scheme that scans by pie slices.

(5) A source of scatterers falling between two adjacent beams is not distinguishable from two sources, one for each beam direction.

(6) Environmental conditions are not normally accounted for during beamforming.

(7) The entire computation is performed at the time of beamforming. Prior computation is not normally used to reduce real time computational load or to permit more complex computations. In addition spectral methods such as Fast Fourier transforms cannot be used when the array elements are not evenly spaced.

The receiver beamformers described above are followed by a temporal processor that for an active sonar involves correlations with matched filters having a range of time delays for range estimation and a range of Doppler frequencies for transverse speed estimation; see Van Trees H. L. "Detection, Estimation and Modulation Theory, Pt III, Radar-Sonar Signal Processing and Gaussian Signals in Noise", Wiley and Sons, 1971. Variations in Doppler frequency across the array for near sources cannot be taken into account because beamforming was previously performed. Similarly variations in range across the array represent error for near sources. Also detection performance is degraded for near sources because of the variation of signal across the array not accurately accounted for by beamforming.

SUMMARY OF INVENTION

The present invention provides for processing received sonar or radar array data in space and time simultaneously in order to obtain the best estimate in a least square sense for the immediately surrounding scatterers and their characteristics. This contrasts with the separation into spatial and temporal parts characteristic of present day sonars. Information regarding the array and environmental propagation are used to precompute a matrix in a lengthy computation. This computation includes conditioning of the matrix so that accurate rapid results will be obtained when this matrix is used for real time sonar computation. The real time computation involves matrix-vector multiplication and takes advantage of the development of new high speed computer architectures for matrix-vector computation, e.g. systolic, and decreasing cost of memory. The region in which scatterers are to be located and characterized is divided by radial annuli instead of by angular pies as in conventional sonar. Storage is reduced in most cases by storing only part of the matrix relevant to a specific annulus and modifying this matrix for use with different annuli.

This simultaneous processing and annular division solves the problems discussed previously which are characteristic of general sonar practice. Direct estimation of the scatterer environment is used which makes no assumptions regarding noise and signal statistics other than dominance of primary scattering. As a result, the response is uniform across angle thus avoiding multiple beam related side lobe degradation and resolution issues, scanning is omnidirectional for first identification of close scatterers in all directions, scatterers may be close to the array relative to array size as plane wave fronts are not assumed, scatterers may be moving at speeds with transverse components large enough to present difficulties for mutlibeam sonars, the use of extensive prior computation permits a more sophisticated sonar than that used in general practice to operate in real time, non uniform spacing of array elements is easily incorporated into the precomputation with no additional cost in real time performance, and environmental propagation characteristics may be included in the prior computation without degrading real time speed.

DESCRIPTION OF THE PREFERRED EMBODIMENTS

Figure 1:
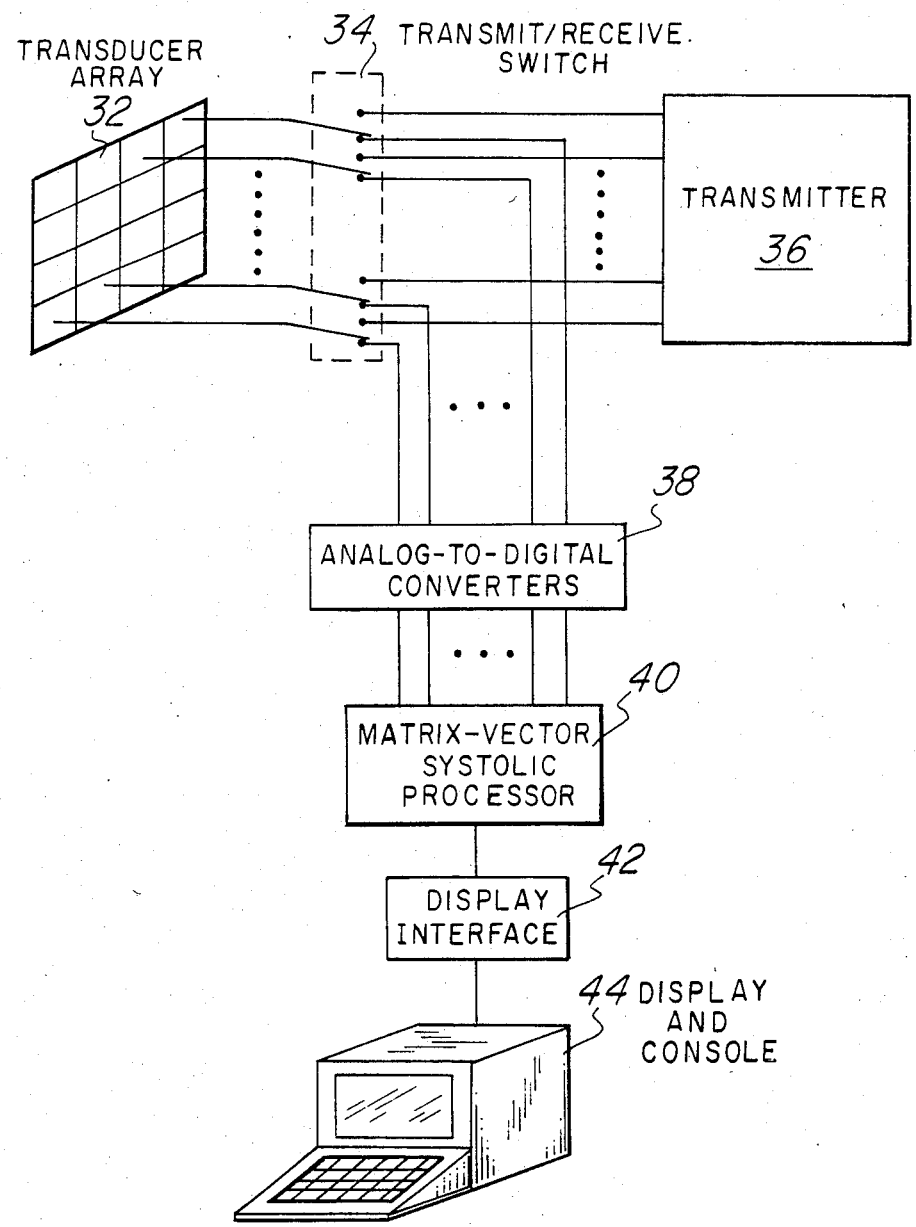
FIG. 1 is a schematic block diagram for a first preferred embodiment sonar system.

FIG. 1 illustrates the components of a first preferred embodiment sonar system for an active sonar in a typical application. The system, generally denoted 30, includes hydrophone array 32, transmit/receive switch 34, transmitter electronics 36, analog to digital converters 38, matrix-vector systolic array processor 40, interface 42, and console and display 44.

The operator console 44 keyboard or a specially designed control panel acts as the input to the system. The operator selects the desired region of ocean he wishes to see and the parameter which he desires to see displayed as a contour plot. For example, he may select a range of 100 to 1000 feet, a range resolution of 20 feet and a Doppler velocity of 10 feet per second and magnitude of scattering strength as the contour or color display parameter. Alternatively, he could select Doppler velocity as the contour parameter and display only scattering strengths above a certain threshold. A control microprocessor reads in the desired display parameters input by the operator at the console 44 keyboard. The unit determines the frequency (e.g. 30 kHz to 120 kHz) and pulse length (e.g. 0.3 msec) to be used based on these inputs and compatibility and equipment preferences. For example, a long maximum range requires a long pulse for energy which then precludes the highest resolution which is only obtainable with the short pulse.

Four by four hydrophone array 32, sensitive to acoustic pressure, acts as the transducer for converting acoustic pressure to electronic voltage in receive mode and vice versa in the transmit mode. A transmit-receive switch 34 enables the hydrophone array to both transmit and receive. The signals supplied to each transducer are appropriately phase shifted with respect to each other so as to form a transmit beam to illuminate the desired region of the medium surrounding the array with a pulse having a narrow band of frequencies as determined by operator inputs. The transmit-receive switch switches to receive as soon as transmission of the transmit pules is completed. The signal from each hydrophone is passed through an analog to digital converter 38. The analog to digital converter box 38 in FIG. 1 is assumed to include appropriate conventional signal processing prior to conversion, such as antialias filters, time varying gain, and signal conditioners. Processing is carried out in systolic matrix-vector processor 40 as described in following sections.

Figure 2:
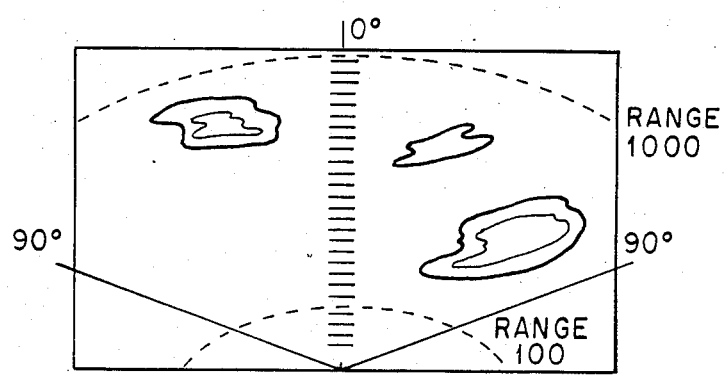
FIG. 2 shows a typical display produced by the first preferred embodiment system.

A TV or graphics display 44 displays the scattering strength for the region of ocean specified by the operator with the parameter selected as a contour or color plot, see FIG. 2 for a tyical display. The operator selects the angular cross section of the region to be displayed on the screen or asks for some rotating sequence. If the operator specifies inconsistent parameters, for example, a higher resolution at longer ranges than reasonable, the highest possible resolution will be used. The display will be correctly annotated and also used to display messages regarding operator inconsistencies or equipment malfunctions.

Figure 3:
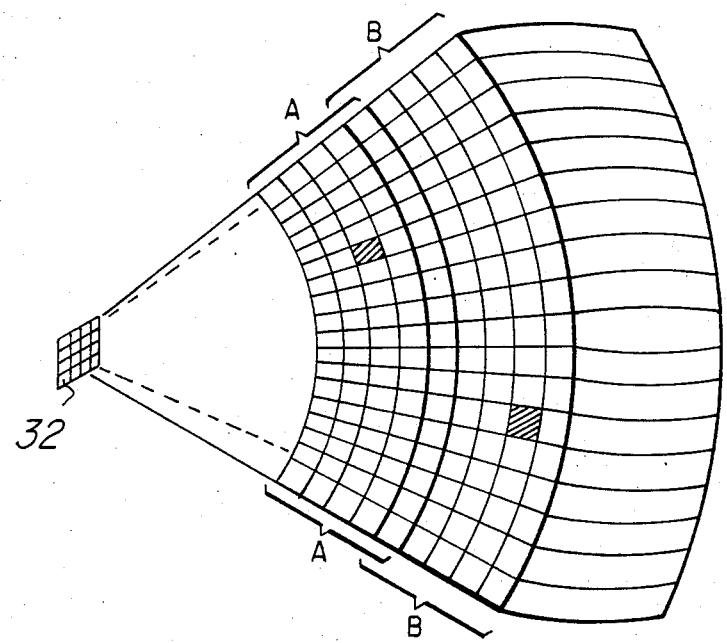
FIG. 3 illustrates the manner of subdividing the region illuminated by a sonar transmit beam for the purpose of processing.

The complete region illuminated by the transmit beam is subdivided into slightly overlapping annular segments. Parts of two annuli are illustrated in FIG. 3 and referenced as A and B. Matching the received signal for a specific time interval with sources in an annulus corresponding to this time interval is reasonable if primary scattering (including local interscatterer mutliple reflections) dominate and the region covered by the transmit beam is fully covered by the subdivided region. Overlap also accounts for the length of the transmitted pulse. The subdivision into annuli permits much faster computation than computing strengths of scatterers for all ranges simultaneously. For example, the number of multiply and add operations required for multiplying an M by M matrix by an M length vector is $M^{**}2$. Performing N matrix-vector computations with matrices of size M/N by M/N is N times faster. The partitioning is by annuli rather than by angular slices as in conventional sonar.

A given annular segment is now further subdivided into volume elements by means of a grid as shown in FIG. 3; a typical element is illustrated by shading. The grid is selected so that the midpoints of the elements are closer to each other than the distance associated with the highest resolution of the full array. This may be determined approximately from the inverse of the overall width of the array for each direction or more exactly by using appropriate equations; see Urick R. J., "Fundamentals of Underwater Sound for Engineers" McGraw-Hill, 1983. A single scatterer located at the center of a volume element is assumed to be representative of that element. Assuming a Gaussian scatterer, i.e. the region has many appropriately equal scatterers, the scatterer at the pth element can be represented by a complex magnitude, Apl, for the lth Doppler frequency. At the frequencies of interest, the complex received signal at the kth time instant and ith array element due to the pth scatterer, having the lth Doppler relative to the center of the array, may be written as a function of the propagation characteristics between them, e.g. the attenuation, time delay and relative direction of the Doppler, $$Zip(Tk, Wl) = Re\{QipAplF(Tk - Sip) \exp[jWiplTk]\} \quad (1)$$

where $F(t) = f(t)\exp[jg]$ is the complex envelope of the transmitted pulse, Sip is the propagation delay between the ith receiver and pth scatterer, Wipl is the lth array center Doppler frequency adjusted to the ith array element and pth scatterer, Qip is the attenuation from the ith array element to the pth scatterer including the attenuation resulting from the transmit beam pattern, Re indicates real part, lower case letters are generally indices, upper case letters are variables, and j is the imaginary unit.

The attenuation, time delay and angles for Doppler computation may be obtained from ray tracing or other means.

The effect due to uncoupled primary scatterers at the ith receiver is then the sum of the effect of each of the P scatterers in the annulus considered, $$Zi(Tk, Wl) = Zi1(Tk, Wl) + \ldots + Zip(Tk, Wl) + \ldots + ZiP(Tk, Wl) \quad (2)$$

If we form a vector of measurements $\underline{Z}(Tk, Wl)$ for the I receivers, we can write this as $$\underline{Z}(Tk, Wl) = \begin{vmatrix} Z1(Tk, Wl) \\ Z2(Tk, Wl) \\ \ldots \\ ZI(Tk, Wl) \end{vmatrix} = Re\{\underline{C}(Tk, Wl)\underline{Al}\} \quad (3)$$

where $\underline{Al}$ is the P component vector of complex magnitudes Apl and $\underline{C}$ is an I by P matrix of all other terms for the kth time sample and lth Doppler and defined by equation (3).

The K received time signals can be concatenated to form a vector $\underline{Z}$ of length IK for the lth Doppler frequency, $$\underline{Z} = \begin{vmatrix} \underline{Z}(T1, Wl) \\ \underline{Z}(T2, Wl) \\ \ldots \\ \underline{Z}(TK, Wl) \end{vmatrix} = Re\{\underline{Cl}\,\underline{Al}\} \quad (4)$$

where $\underline{Cl}$ has IK rows and P columns and applies to the lth Doppler and is defined by equation (4). Of course, $\underline{Cl}$ is essentially the $\underline{C}(Tk, Wl)$ stacked up with $\underline{C}(T1, \overline{Wl})$ on top and $\underline{C}(TK, \overline{Wl})$ at the bottom.

As $\underline{Al}$ and $\underline{Cl}$ are complex we may write them as sums of real and imaginary parts $$\underline{Al} = \underline{Al'} + j\underline{Al''} \qquad \underline{Cl} = \underline{Cl'} + j\underline{Cl''} \quad (5)$$

Hence $$\underline{Z} = \underline{Ml} \begin{vmatrix} \underline{Al'} \\ \underline{Al''} \end{vmatrix} \quad \text{with } \underline{Ml} = [\underline{Cl'}, \underline{Cl''}] \quad (6)$$

The minimum mean square estimate can be derived as $$\begin{vmatrix} \underline{Al'} \\ \underline{Al''} \end{vmatrix} = \{[\underline{Ml}^*\underline{Ml}]^{\sim}\underline{Ml}^*\}\underline{Z} = \underline{Dl}\,\underline{Z} \quad (8)$$

Where $\underline{Dl}$ is a 2P by IK matrix defined by equation (8) and * indicates transpose (all the matrices and vectors are real) and $\sim$ indicates inverse. However, $\underline{Ml}$ will probably be ill conditioned because the original space was oversampled. For example, the scattering strengths of two close scatterers, having indistinguishable effect on the data within the level of noise present, cannot be separately estimated. The ill conditioning resulting from such situations will prevent the determination of a correct solution with equation (8) unless it is taken into account in formulating $\underline{Dl}$. Ill conditioning is handled during the precomputation by using singular value decomposition (see Lawson C. L and Hanson R. J. "Solving Least Squares Problems", Prentice-Hall, 1974) of the matrix $\underline{Ml}$ to form, $$\underline{Ml} = \underline{Ul}\,\underline{Ll}\,\underline{Vl}^* \quad (9)$$

where the unitary matrices $\underline{Ul}$ and $\underline{Vl}$ are the eigenvector matrices for $\underline{Ml}\,\underline{Ml}^*$ and $\underline{Ml}^*\underline{Ml}$, respectively. Consequently, equation (6) may be written as $$\underline{Z} = \underline{Ul}\,\underline{Ll}\,\underline{Vl}^* \begin{vmatrix} \underline{Al'} \\ \underline{Al''} \end{vmatrix} \quad (10)$$

$\underline{Ll}$ is a diagonal IK by 2P matrix having the singular values of $\underline{Ml}$ as the values on the diagonal. Assuming that only B singular values exceed a selected percentage of the maximum, the others are replaced with zeroes. As a result the matrix $\underline{Dl}$ in equation (8) may be replaced by a conditioned matrix, $$\underline{Dlc} = \underline{Vlt}\,\underline{Llt}^{\sim}\,\underline{Ult}^* \quad (11)$$

where $\underline{Ult}$ is a truncated version of $\underline{Ul}$ and has dimension IK by B, $\underline{Vlt}$ is a truncated version of $\underline{Vl}$ and has dimension 2P by B and $\underline{Llt}^{\sim}$ is a diagonal matrix having reciprocals of the dominant singular values on the diagonal and has dimension B by B.

The matrix $\underline{Dlc}$ is a properly conditioned version of matrix $\underline{Dl}$ and has the same dimension, 2P by IK. It is only necessary to multiply the data by the matrix $\underline{Dlc}$ in real time operation of the sonar in order to determine the scatterer strengths for each of the scatterers in the annulus selected having a Doppler of Wl.

$$\left| \begin{array}{c} \underline{Alc'} \\ \underline{Alc''} \end{array} \right| = \underline{Dlc}\underline{Z} \qquad (12)$$

The matrix-vector multiplication can be performed in 2P times I times K "multiply and add" operations. The major part of the computation, deriving $\underline{Dlc}$ is performed in advance and stored.

If strengths over a range of Doppler frequencies are required the computation is repeated for l=1 to L. A number of matrices must be stored or computed from a typical one by adjusting for the change in Doppler frequency.

In addition to computing the optimum least square scatterer strength for the lth Doppler we compute the mean square error El between the actual measurements Z and those estimated by solution of equation (12), $\underline{Z1A1}$ $$El = [\underline{Z} - \underline{MlAl}]^*[\underline{Z} - \underline{MlAl}] \qquad (13)$$

This involves a further matrix-vector computation of $\underline{MlAl}$ and an inner product computation. If this error is above a certain value it is assumed that negligible scatterers exist at this Doppler frequency and the results of the scattering strength computation are not displayed. The confidence number obtained in the form of this error is normally displayed for the operator to determine the significance of the scattering strength results presented.

Each segment in FIG. 3 for a different radius annulus would require a separate different matrix $\underline{Dlc}$. We assume for this implementation that the environment and distances involved to the scatterers is such that the acoustic energy propagates in a straight path. Also each annulus is assumed to be subdivided in a similar manner differing only by expanding the geometry. In this case, the matrices for the different annuli are related in simple manner. Consequently only one matrix need be stored and the others for different annuli may be computed from it. This reduces the storage required substantially. Specific properties of environmental propagation may be included from ray tracing at the cost of additional storage.

An alternative procedure, frequently followed in signal processing, is to generate an analytic function for which the real part is the actual data and the imaginary part is computed by quadrature filtering or obtained during sampling. A parallel formulation of the equations to that presented may be used to derive a matrix-vector real time computation as in the case described here.

Figure 4:
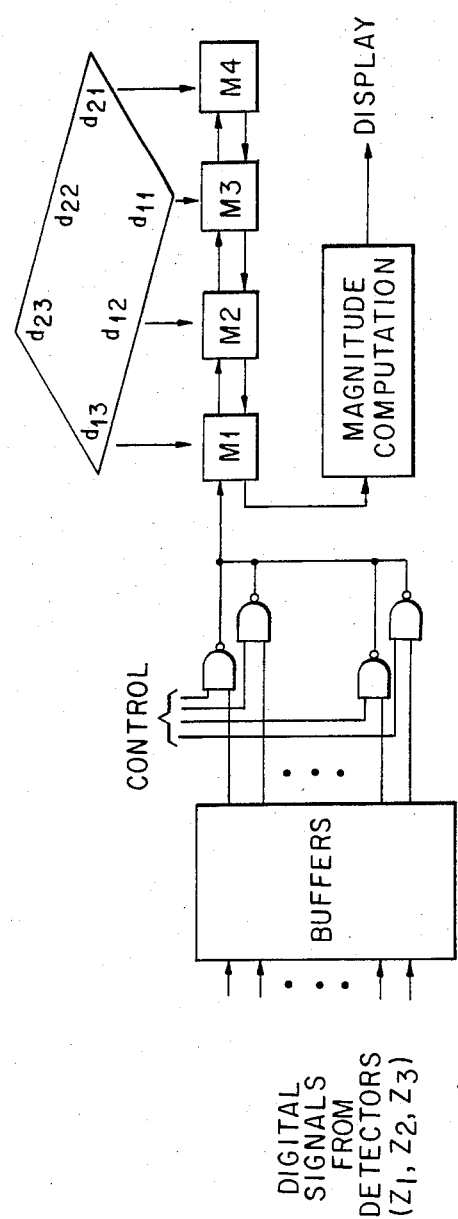
FIG. 4 shows the matrix-vector systolic processor for computing scatterer strengths as a function of location.

FIG. 4 shows a systolic implementation for the matrix-vector multiplication of equation (12), the major part of the real time computation. A systolic implementation is economic to manufacture because only nearest neighbor connections are used. The input samples from the hydrophones are fed sequentially into a serial stream of processing multiply and add elements; see Kung H. T., "High Performance Microprocessor to be used in Groups of Hundreds", IEEE EASCON, Sep., 1983. The illustration shows how a two by three matrix $\underline{D}$ may be multiplied by a three vector $\underline{Z}$. Each processor stores a diagonal of the matrix $\underline{D}$ as shown. The result of the multiplication is accumulated from right to left. At the third processor M3 the multiplication z1×d11 is performed and the result passed to processor M2. At processor M2 z2 has just arrived from the left and this is multiplied by the stored value d12 and the result added to the accumulated result from the right. At the same time the multiplication of z1 and d21 occurs in processor M4 and so on. Consequently, up to (P+IK−1) processors could be used effectively in parallel. The matrix coefficients are used in sequence and may therefore be rapidly addressed via stacks in each processor. These coefficients remain in the processors and are modified by scaling for different range computations as suggested previously. The only input and output are the measured data flowing into the processor from the left and the output estimates of scattering strength exiting from the left.

The magnitude of the scattering strength is computed before passing the output to the display. Note that this can be accomplished with negligible memory if the matrix rows are rearranged so that odd indexed values are the real parts and even number indices the imaginary parts, rather than having all real parts first and then all imaginary parts next. The magnitude values are displayed across the screen in the manner prescribed by the geometry configuration for the case selected.

The same matrix-vector processor may be used to compute the error, equation (13), indicating the validity of the scatterer computation as described previously. In this case the error is passed to the display unit for display.

VARIATIONS AND MODIFICATIONS

1. Doppler independent system

A simplification for the previously described active sonar permits much more rapid computation by neglecting consideration of Doppler. In this case, all matrices for the different Dopplers, $\underline{Ml}$, l=1 to L are added and only one computation is required to determine scattering strength in real time. Singular value decomposition is again used to compute the matrix $\underline{Dc}$ for use in the real time processor. The result is an equation similar to equation (12), $$\left| \begin{array}{c} \underline{A'} \\ \underline{A''} \end{array} \right| = \underline{Dc}\underline{Z}$$

2. Passive Sonar

In the case of a passive sonar, a similar procedure to that for the active sonar is followed. The region illuminated by the array is subdivided into regions, (FIG. 3). A representative source is taken at the center of each region. In this case the source is assumed to emit a signal representable by a stationary random process with a power spectrum Y(w) and a sample function y(t). We use the time function of the source in order to utilize the array properties. The kth time sample of the received signal at the ith array element resulting from the pth source is $$Zip(Tk) = QipYp(Tk - Sip) \qquad (15)$$

where Qip is attenuation between the pth source and ith array element Sip the propagation delay between the pth source and the ith element and Yp is the sample function at the pth source. The Fourier Transform of the k=1 to K set of time samples at the ith receiver is $$Zip(w) = QipYp(T1)\exp[jwSip]\exp[-jwT1] + \qquad (16)$$

-continued $$Q_{ip}Y_p(T2)\exp[jwSip]\exp[-jwT2] + \ldots +$$

$$Q_{ip}Y_p(TK)\exp[jwSip]\exp[-jwTK]$$

The ith receiver signal for all sources is $$Z_i(w) = Z_{i1}(w) + Z_{i2}(w) + \ldots + Z_{iP}(w) \quad (17)$$

Forming a vector for all array elements $$\underline{Z}(w) = \underline{C}(w)\underline{Y}(w) \quad (18)$$

where $\underline{C}(w)$ contains the terms other than source terms in the above equations. The minimum mean square estimate of the Fourier Transform of the time function at the sources is (defining $\underline{D}$)

$$\underline{Y}(w) = (\underline{C^*C})^\sim \underline{C^*}\underline{Z}(w) = \underline{D}\underline{Z}(w) \quad (19)$$

In a similar manner to that used for the active sonar, we precompute $\underline{D}(w)$ using a singular value decomposition to take care of the singularities; see Lawson C. L and Hanson R. J. "Solving Least Squares Problems", Prentice-Hall, (1974). Hence, in real time we need to take an FFT of the data and multiply by the matrix $\underline{D}$ to obtain the estimates of the transforms of the sample function at each source. An estimate of the power spectrum of each source is now obtained by squaring the magnitude of this frequency function and averaging over several sets of data observations as in the direct method of spectral estimation; see Oppenheim A. V. and Schafer R. W. "Digital Signal Processing", Prentice-Hall 1975.

3. Alternative fast computation techniques

Another example of reducing computation by partitioning occurs when we perform detection of a single target in a background of noise using a large array. Only one source or reflector is considered inside the region at a time and all other sources or reflectors are considered to be adequately modeled as plane wave generators. In this case the matrices are reduced in dimension to include only the outermost segments and the selected segment. The matrix is much smaller but there is now a matrix for each new segment selected.

A fast solution technique is to store all the inverse matrices. The parameters associated with each specific segment are computed in turn by multiplication of the measurements with the specific inverse matrix. The results may be combined to generate a map as if all segment parameters had been computed simultaneously. The outermost segments, for which parameters are computed at each computation, are averaged to generate the composite plot.

A second method requires significantly less storage but is slower. The inverse part of the matrix concerned with the outermost (plane wave) sources is stored. The matrix inverse is updated, as part of the real time computation, to include the effects of the specific segment of interest. The results are combined as before for the purpose of post processing and display.

A residual value or error indicating a goodness of fit is obtained corresponding to each internal segment in a similar manner as described previously. The residual is the root mean square of the difference between the actual measurements and those estimated using the solutions for the segment sources or reflectors as described previously. In this case, the residual may be provided as a spatial map in both active and passive cases. The smallness of the residual value indicates the likelihood of a target at that position. A high residual everywhere may indicate the presence of more than one target in the interior region. In this case it may be desirable to partition differently, for example compute all segments in a specific range of times.

I claim:

1. In a radar or sonar system a method of estimation of sources of stationary random processes with an array of detectors (labelled with i from 1 to I), comprising the steps of:
    (a) subdividing the region containing said sources into annular segments from the center of said array and further subdividing each of said annular segments into volume elements (labelled p from 1 to P) of diameter less than the resolution of said array so the sources within each element may be represented by a single source;
    (b) forming an I by P matrix C(w) with the i,p element equal to $Q_{ip}\exp[jwSip]$ where $Q_{ip}$ is the attenuation between the pth source and the ith array detector and Sip is the propagation delay between the pth source and the ith array detector;
    (c) computing a P by I matrix D(w) equal to $[C(w)^*C(w)]^\sim C(w)^*$ with * denoting the transpose and $\sim$ denoting the inverse of a matrix;
    (d) time sampling the energy received from said sources by each of said array detectors and Fourier transforming said samples to form an I component vector Z(w); and
    (e) matrix multiplying D(w)Z(w) to yield a P component vector Y(w) which are the power spectrum estimates for the P sources.

2. The method of claim 1, comprising the further steps of:
    (a) conditioning said matrix D(w) by using a singular value decomposition, replacing all singular values less than a selected fraction of the maximum singular value with zeroes in the diagonal matrix of the decomposition, and truncating the multiplying matrices corresponding to said replacing.

3. In a radar or sonar system a method of estimation of scatterers near an array of detectors (labelled i from 1 to I) by detection of the scattering of an energy pulse transmitted towards said scatterers, comprising the steps of:
    (a) subdividing the region containing said scatterers into annular segments from the center of said array and further subdividing each of said annular segments into volume elements (labelled p from 1 to P) of diameter less than the resolution of said array so that the scatters within each element may be represented by a single scatterer;
    (b) selecting one of said annular segments and a Doppler frequency Wl relative to the center of said array;
    (c) selecting K sampling labelled Tk from T1 to TK in the time interval [s, t] where s corresponds to the time said energy pulse would arrive at the center of said array if reflected from the near face of said selected annular segment and t corresponds to the time said energy pulse would arrive at the center of said array if reflected from the far face of said annular segment;
    (d) forming an IK by P matrix C for said selected segment and said selected Doppler frequency Wl, said matrix elements labelled by ik and p and equal to $Q_{ip}F(T_k=S_{ip}) \exp[jW_{ipl}T_k]$ where $F(.)$ is the complex envelope of said transmitted energy pulse, $S_{ip}$ is the propagation delay between said ith detector and pth scatterer, $W_{ipl}$ is the lth array center Doppler frequency adjusted to the ith detector and pth scatterer, $Q_{ip}$ is the attenuation from the ith detector to the pth scatterer including the attenuation resulting from the transmit energy pulse beam pattern;

(e) computing a P by IK matrix D so Re{CD} is the identity matrix;

(f) transmitting said energy pulse from said array towards said scatterers;

(g) time sampling at said times $T_k$ the energy scattered from said pulse by said scatterers and received by said detectors; and (h) matrix multiplying said matrix D times the vector formed from concatenating the signals received by said I detectors at said K sampling times and summed over said P representative scatterers, thereby forming the estimation for said P representative scatterers in said selected annulus annular segment at said Doppler frequency and an estimation of said scatterers.

4. The method of claim 3, wherein:

(a) said computing matrix D includes separating said matrix C into real and imaginary parts, forming a IK by 2P real matrix M by joining Re{C} with −Im{C}, and setting D equal to [M*M]~M* with * denoting the transpose and ~ denoting the inverse of a matrix, whereby D is a real 2P by IK matrix and the estimation for the P representative scatterers has 2P real components which are the real and imaginary parts of a P component complex estimation.

5. The method of claim 4, comprising the further step of:

(a) conditioning said matrix D by using a singular value decomposition, replacing all singular values less than a selected fraction of the maximum singular value with zeroes in the diagonal matrix of the decomposition, and truncating the multiplying matrices corresponding to said replacing.

6. The method of claim 5, comprising the further steps of:

(a) repeating said estimation for other of said annular segments.

7. The method of claim 4, comprising the further steps of:

(a) repeating said estimation for other of said annular segments.

8. The method of claim 3, comprising the further step of:

(a) conditioning said matrix D by using a singular value decomposition, replacing all singular values less than a selected fraction of the maximum singular value with zeroes in the diagonal matrix of the decomposition, and truncating the multiplying matrices corresponding to said replacing.

9. The method of claim 8, comprising the further steps of:

(a) repeating said estimation for other of said annular segments.

10. The method of claim 3, comprising the further steps of:

(a) repeating said estimation for other of said annular segments.

11. The method of claim 3, comprising the further steps of:

(a) repeating said formation of matrix C for each of a selected set of Doppler frequencies, $W_l$ from $W_1$ to $W_L$; and (b) summing all of such matrices C to form matrix C+, and using C+ to compute D.

* * * * *